(12) United States Patent
Kakiuchi

(10) Patent No.: US 7,072,192 B2
(45) Date of Patent: Jul. 4, 2006

(54) POWER CIRCUIT RESTRAINING RUSH CURRENT

(75) Inventor: Shinichi Kakiuchi, Saitama (JP)

(73) Assignee: PENTAX Corporation, Tokyo (JP)

( * ) Notice: Subject to any disclaimer, the term of this patent is extended or adjusted under 35 U.S.C. 154(b) by 0 days.

(21) Appl. No.: 11/078,362

(22) Filed: Mar. 14, 2005

(65) Prior Publication Data

US 2005/0201125 A1    Sep. 15, 2005

(30) Foreign Application Priority Data

Mar. 15, 2004   (JP)   ............... P2004-072496

(51) Int. Cl.
*H02M 7/00*   (2006.01)
*H02M 7/44*   (2006.01)
*H02M 5/42*   (2006.01)

(52) U.S. Cl. ................. 363/50; 363/97; 323/908

(58) Field of Classification Search ............ 363/49, 363/50, 21.04, 21.12, 95, 97; 323/901, 908
See application file for complete search history.

(56) References Cited

U.S. PATENT DOCUMENTS

| 5,274,208 | A | * | 12/1993 | Noda | ............... | 219/715 |
| 5,377,213 | A | | 12/1994 | Honda | | |
| 5,508,904 | A | * | 4/1996 | Hara | ............... | 363/21.11 |
| 6,272,024 | B1 | * | 8/2001 | Uchida | ............... | 363/21.12 |
| 6,798,175 | B1 | | 9/2004 | Hanada et al. | | |
| 6,831,447 | B1 | * | 12/2004 | Wittenberg | ............... | 323/222 |

FOREIGN PATENT DOCUMENTS

JP    5-69964    9/1993
JP    10-56732   2/1998

OTHER PUBLICATIONS

English Language Abstract of JP 10-56732.

* cited by examiner

*Primary Examiner*—Bao Q. Vu
(74) *Attorney, Agent, or Firm*—Greenblum & Bernstein, P.L.C.

(57) ABSTRACT

A power circuit for an electronic machine includes first and second step-up circuits, and a voltage applier. The first step-up circuit has a step-up transformer and a current controller. The current controller controls the amount of current supplied to the primary side of the step-up transformer according to the amount of voltage at the secondary side of the step-up transformer, so that the voltage applied to the primary side of the step-up transformer by a D.C. power source is stepped up to a first voltage. The second step-up circuit steps voltage applied by the D.C. power source up to a second voltage being smaller the first voltage. The voltage applier applies the second voltage to the secondary side of the step-up transformer. The current controller controls the amount of current supplied to the primary side of the step-up transformer according to the second voltage when the first step-up circuit starts, so that rush current caused by starting the first step-up circuit is restrained.

11 Claims, 1 Drawing Sheet

POWER CIRCUIT RESTRAINING RUSH CURRENT

BACKGROUND OF THE INVENTION

1. Field of the Invention

The present invention relates to controlling a power circuit, especially to controlling rush current occurring in a step-up circuit included in a power circuit.

2. Description of the Related Art

Some electronic machines have conventional power circuits including a plurality of voltage transforming circuits to change up or down the voltage applied by a common power source to various voltages.

Some methods for protecting electronic machines from rush current occurring when they start, are known. For example, the flow of rush current into an electronic machine is restrained by gradually applying the voltage to the electronic machine during the starting time.

However, if a voltage is gradually applied to the electronic machine, a circuit for controlling this rush current is necessary, therefore, the structure of the electronic machine should be complex. Further, in this case, operability of the electronic machine becomes low, because it takes a long time to start.

In a power circuit having a plurality of voltage transforming circuits, when rush current occurs in one of these voltage transforming circuits, other circuits are negatively impacted. That is, the voltage supplied by each voltage transforming circuit, becomes lower. In the step-down circuits for generating lower voltages than the voltage from the power source, to be provided to microcomputers and so on, this negative impact is more serious than in the step-up circuits. This is because the ratio of voltage drop against generated voltage is larger in step down circuits than in step-up circuits. Therefore, rush current can cause serious problems to loads such as microcomputers.

SUMMARY OF THE INVENTION

Therefore, an object of the present invention is to provide a power circuit that has a plurality of voltage transforming circuits for generating various voltages from a common power source, that has simple structure and high controllability, and that can prevent the negative impact of rush current.

A power circuit according to the present invention, is for an electronic machine. The power circuit has a first step-up circuit, a second step-up circuit, and a voltage applier. The first step-up circuit has a step-up transformer and a current controller to control the amount of current supplied to the primary side of the step-up transformer according to the amount of voltage at a secondary side of the step-up transformer, so that a voltage applied to the primary side of the step-up transformer by a D.C. power source is stepped up to a first voltage. The second step-up circuit steps the voltage applied by the D.C. power source up to a second voltage being smaller than the first voltage. The voltage applier applies the second voltage to the secondary side of the step-up transformer. The current controller controls the amount of current supplied to the primary side of the step-up transformer according to the second voltage when the first step-up circuit starts, so that rush current caused by starting the first step-up circuit is restrained.

A rush current restraining circuit according to the present invention, is for an electronic machine, and includes a step-up circuit and a voltage applier. The step-up circuit has a step-up transformer and a current controller to control the amount of current supplied to a primary side of the step-up transformer according to the amount of voltage at a secondary side of the step-up transformer, so that the voltage applied by a D.C. power source is stepped up to a first voltage. The voltage applier applies a second voltage, being larger than the voltage applied by the D.C. power source and being smaller than the first voltage, to the secondary side of the step-up transformer. The current controller controls the amount of current supplied to the primary side of the step-up transformer according to the second voltage when the step-up circuit starts, so that rush current caused by starting the step-up circuit is restrained.

BRIEF DESCRIPTION OF THE DRAWINGS

The present invention will be better understood from the description of the preferred embodiment of the invention set forth below together with the accompanying drawing, in which.

DESCRIPTION OF THE PREFERRED EMBODIMENTS

Figure 1:
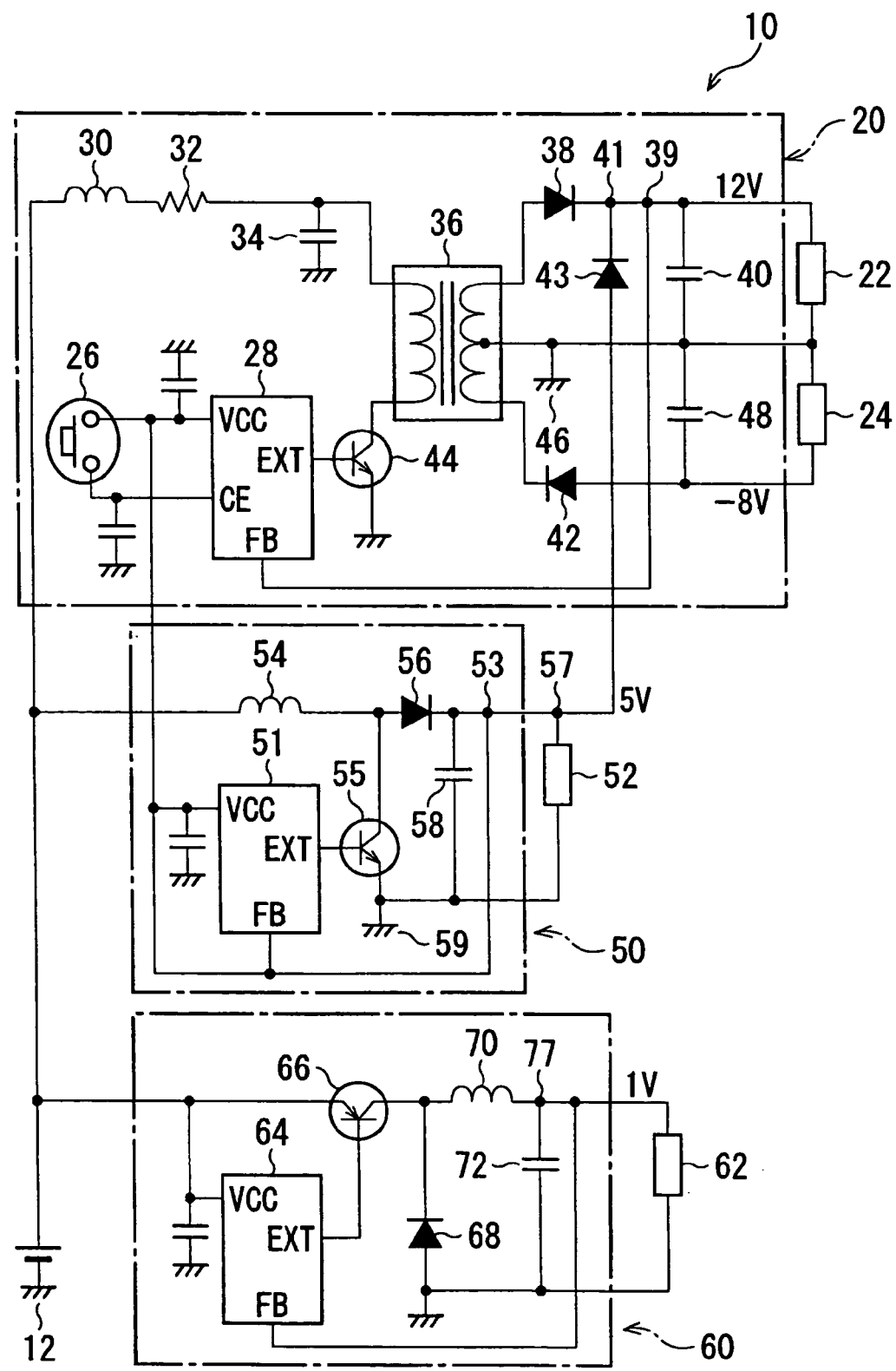
FIG. 1 is a block diagram of the power circuit of the embodiment of the present invention.

Hereinafter, the preferred embodiment of the present invention is described with reference to the attached drawing.

FIG. 1 is a block diagram of the power circuit of the embodiment of the present invention.

A power circuit 10 is provided in a digital camera (not shown), and has an imaging device power circuit 20, a motor driving power circuit 50, and a microcomputer power circuit 60. When a D.C. power source 12 is set in a battery room (not shown), the D.C. power source 12 is connected to the imaging device power circuit 20, the motor driving power circuit 50, and the microcomputer power circuit 60 to apply 1.8(V) to each of these circuits. The imaging device power circuit 20, the motor driving power circuit 50, and the microcomputer power circuit 60, transform the voltage applied by the D.C. power source 12 to predetermined voltages and supply the predetermined voltages to each of the loads. That is, the imaging device power circuit 20 applies 12(V) and −8(V) to terminals 22 and 24 of an imaging device respectively, the motor driving power circuit 50 applies 5(V) to an actuator 52 such as a motor for driving lenses, and the microcomputer power circuit 60 applies 1(V) to a microcomputer 62.

The imaging device power circuit 20 does not always operate when the digital camera is driven. It operates only when power to the imaging device is required, such as when photographing and reproducing images. That is, the imaging device power circuit 20 operates intermittently based on the control signals from a CPU (not shown). When the imaging device power circuit 20 starts by turning a switch 26 on, a first transistor 44 is switched to the on state, collector current flows through the first transistor 44, and current is supplied to the primary side of the step-up transformer 36.

Current supplied to the step-up transformer 36 from the D.C. power source 12 when the imaging device power circuit 20 starts, is smoothed by a smoothing coil 30 and a smoothing capacitor 34. When current flows through the primary-winding of the step-up transformer 36, larger amounts of voltage and current are generated at the secondary side of the step-up transformer 36. Current generated at the secondary side of the step-up transformer 36, flows to a first diode 38. The anode side of the first diode 38 is connected to the secondary side of the step-up transformer 36, and a first capacitor 40 is charged by current from the first diode 38. As a result of this, voltage generated at the secondary side of the step-up transformer 36 is further stepped up, and applied to the input-terminal 22 of the imaging device.

On the other hand, a cathode side of a second diode 42 is connected to the secondary side of the step-up transformer 36. When current flows to the step-up transformer 36 through the second diode 42, voltage at the output-terminal of the imaging device 24 becomes negative on the basis of a GND 46.

Voltage at the first capacitor 40 is detected by a feedback terminal FB of a first switching regulator 28, via a first articulation point 39. The first switching regulator 28, connected between the first diode 38 and the first capacitor 40, modulates the length of the on-time and the off-time of the first transistor 44 according to the voltage of the first capacitor 40. That is, when the feedback terminal FB detects a lower voltage, the first switching regulator 28 makes a duty ratio of the output voltage higher and makes the amount of base current per unit time larger, so that the on-time of the first transistor 44 becomes longer. When the on-time of the first transistor 44 is longer, the voltage stepped up at the secondary side of the step-up transformer 36 is larger.

Therefore, when the voltage of the first capacitor 40 is smaller, the increase in voltage at the secondary side of the step-up transformer 36 is larger, and when the voltage of the first capacitor 40 is larger, the increase in voltage at the secondary side of the step-up transformer 36 is restrained. As a result of this control, voltage at the first capacitor 40 and a second transistor 48 are respectively stabilized. That is, the amounts of voltage applied to the input-terminal 22 and the output-terminal 24 of the imaging device, are constant as 12(V) and −8(V) respectively against the GND 46.

The motor driving power circuit 50 operates continuously when the digital camera is driven, and applies voltage to the actuator 52 and so on. Because the voltage applied to the actuator 52 should be larger than the 1.8(V) applied from the D.C. power source 12, the motor driving power circuit 50 functions as a step-up circuit.

When a second switching regulator 51 supplies base current, a second transistor 55 turns on. Therefore, current from the D.C. power source 12 flows to a second GND 59 via a first coil 54, and magnetic energy is accumulated in the first coil 54. Further, when the second switching regulator 51 stops supplying the base current and the second transistor 55 turns off, current from the D.C. power source 12 flows to a third capacitor 58 and the actuator 52 connected to the fourth diode 56 in parallel with the third capacitor 58, via the fourth diode 56. At this time, the third capacitor 58 is charged by magnetic energy accumulated in the first coil 54 and transferred to the third capacitor 58 via the fourth diode 56. Note that the second transistor 55 is connected to the first coil 54, in parallel with the fourth diode 56.

Voltage at the third capacitor 58 is detected by a feedback terminal FB of the second switching regulator 51, via a third articulation point 53. The second switching regulator 51 modulates the length of the on-time of the second transistor 55 according to the voltage detected by the feedback terminal FB of the second switching regulator 51, as well as the first switching regulator 28. That is, when the voltage at the third capacitor 58 detected by the feedback terminal FB is the lower, the second switching regulator 51 makes a duty ratio of the output voltage higher, and then the on-time of the second transistor 55 becomes longer. Therefore, when the voltage at the third capacitor 58 is lower, increase in voltage of the first coil 54 is larger, and when the voltage at the third capacitor 58 is higher, increase in voltage of the first coil 54 is restrained. As a result of this, the voltage at the third capacitor 58 becomes constant and the voltage is 5(V) in this embodiment.

The 5(V) voltage applied to the actuator 52, is also applied to the first capacitor 40 of the imaging device power circuit 20 via the third articulation point 57 and a third diode 43 that is connected between the first diode 38 and the first capacitor 40 in parallel with first switching regulator 28. The motor driving power circuit 50 operates continuously during the digital camera is driven, differing from the imaging device power circuit 20. Therefore, the voltage of 5(V) from the motor driving power circuit 50 is applied to the first capacitor 40 before the imaging device power circuit 20 starts.

The microcomputer power circuit 60 is always in the on state when the digital camera is driven, and applies voltage to the microcomputer 62 and so on. Because the voltage applied to the microcomputer 62 should be 1(V), which is smaller than the 1.8(V) applied from the D.C. power source 12, the microcomputer power circuit 60 functions as a step-down circuit.

When a third switching regulator 64 supplies the base current from the external terminal EXT, a third transistor 66 turns on. Therefore, current from the D.C. power source 12 flows to a second coil 70 via the third transistor 66, and a fourth capacitor 72 is charged. The amount of current supplied to the fourth capacitor 72, is in proportion to the product of the voltage of 1.8(V) applied by the D.C. power source 12 and the on-time of the third transistor 66.

On the other hand, when the third switching regulator 64 does not supply base current from the external terminal EXT, and the third transistor 66 turns off, current flows to the second coil 70 from the fourth capacitor 72, via a fifth diode 68. The amount of the current is in proportion to the product of the output voltage, that is the voltage applied to the microcomputer 62, and the off-time of the third transistor 66.

Here, because the amount of current flowing to the second coil 70 is constant regardless of the on or off state of the third transistor 66, the amount of voltage applied to the microcomputer 62 is the product of the 1.8(V) of the input voltage and the ratio of the on-time of the third transistor 66 to its off-time. In this embodiment, voltage at the fourth capacitor 72 is detected by the feedback terminal FB of the third switching regulator 64 via a fourth articulation point 77, and the third switching regulator 64 modulates the length of the on and off-time of the third transistor 66 according to the detected voltage of the fourth capacitor 72. As a result of this, the output voltage to the microcomputer 62 is a constant 1(V).

Note that the power circuit 10 can be configured by conventional elements. For example, the first and the second switching regulator 28 and 51 can be "XC6368D105MR" produced by TOREX SEMICONDUCTOR LTD., the third switching regulator 64 can be "XC6366D105MR" produced by TOREX SEMICONDUCTOR LTD. Further, the first and the second transistor 44 and 55 can be "Si1406DH" produced by VISHAY SILICONIX, and the third transistor 66 can be "Si1413DH" produced by VISHAY SILICONIX.

When the imaging device power circuit 20 starts by turning on the switch 26 based on a control signal from the microcomputer 62, the feedback voltage control carried out by the first switching regulator 28 based on the detected voltage at the first articulation point 39 is delayed, due to the fact that the primary and secondary sides of the step-up transformer 36 are connected only by magnetic field. Therefore, rush current in an amount that is much larger than an acceptable amount, flows to the primary side of the step-up transformer 36 from the D.C. power source 12.

However, as mentioned above, the 5(V) voltage is applied to the first articulation point 39, via the third diode 43 and the second articulation point 41. Therefore, even in the situation where a raised voltage is yet to be generated at the secondary side of the step-up transformer 36, a constant voltage of 5(V) is applied to the feedback terminal FB of the first switching regulator 28, via the first articulation point 39. As a result of this, when the imaging device power circuit 20 starts, the first switching regulator 28 sets the duty ratio of the output voltage according to the 5(V) voltage (not the 0(V) voltage) detected at the terminal FB. Then the collector current flowing to the primary side of the step-up transformer 36 through the first transistor 44, is restrained by the first switching regulator 28 to be smaller than that in the case where the feedback terminal FB detects 0(V) voltage. Therefore, the amount of the current flowing to the primary side of the step-up transformer 36 is reduced, so that the rush current is restrained.

Starting the stepping up operation by the step-up transformer 36 is delayed due to controlling the amount of current flowing to the primary side of the step-up transformer 36. However, the necessary time for stepping up to 12(V) is shorter than it would be in the case where no voltage is applied to the first capacitor 40 from the motor driving power circuit 50, because a voltage of 5(V) has already been applied to the first capacitor 40 when starting the imaging device power circuit 20.

Further, a resistor 32 is provided at the input-side of the smoothing capacitor 34. The resistance of the resistor 32 is 1.0 ($\Omega$), and it restrains rush current flowing to the smoothing capacitor 34 from the D.C. power source 12. When the first transistor 44 turns on and voltage at the primary side of the step-up transformer 36 drops significantly, the resistor 32 prevents the terminal voltage of the D.C. power source 12 from dropping.

When rush current flows into the imaging device power circuit 20, the voltage applied by the D.C. power source 12 drops so that the voltage applied to the motor driving power circuit 50 and the microcomputer power circuit 60 also drops to the same amount. The voltage to be applied to the microcomputer 62 is 1(V), and this is smaller than the voltage of 1.8(V) from the D.C. power source, so that the microcomputer power circuit 60 functions as a step-down circuit differing to the motor driving power circuit 50. Generally, step-down circuits can easily have a negative impact on the output voltage when changing the input voltage, because step-down circuits can not raise the input voltage. Therefore, the microcomputer power circuit 60 can easily become incapable of maintaining the output voltage to the microcomputer 62, when the level of the voltage applied by the D.C. power source 12 becomes slightly lower than the minimum acceptable level. That is, the microcomputer power circuit 60 can easily be negatively impacted by rush current. In this embodiment, the microcomputer power circuit 60 can be protected from rush current by applying voltage to the imaging device power circuit 20 from the motor driving power circuit 50 via the second articulation point 41 and reducing the amount of rush current with the resistor 32.

In the embodiment mentioned above, the power circuit 10 that can restrain rush current, is provided without any special mechanism, by applying a voltage to the imaging device power circuit 20 in which rush current is caused, from the motor driving power circuit 50 which is widely used in digital cameras. Further, setting the resistor 32 in the imaging device power circuit 20 can help restrain rush current. In the power circuit 10, the microcomputer power circuit 60, being a step-down circuit that can more easily be affected by rush current than step-up circuits, can be protected. In addition to these effects, a restriction at the starting time of the imaging device power circuit 20, in which voltage is applied gradually is not necessary, and starting the imaging device power circuit 20 takes only a short time. Therefore, photographing operation of the digital camera can be done promptly.

The amount of voltage applied to the imaging device power circuit 20 for preventing rush current, is not limited to 5(V) as long as it is higher than that of the voltage from the D.C. power circuit 12, such as 1.8(V) in this embodiment. For example, a voltage of 3.3(V) can be applied to the imaging device power circuit 20. Further, the voltage source is not limited to the motor driving power circuit 50, and other circuits not shown in FIG. 1 can be used.

The resistance of the resistor 32 is not limited to 1.0 ($\Omega$). For example, the resistance can be in the range of 0.5–1.5 ($\Omega$), and a resistance of less than 0.5 ($\Omega$) may be used when the voltage from the D.C. power source 12 is over 1.8(V).

Finally, it will be understood by those skilled in the art that the foregoing description is of a preferred embodiment of the apparatus, and that various changes and modifications may be made to the present invention without departing from scope thereof.

The present disclosure relates to subject matter contained in Japanese Patent Application No.2004-072496 (filed on Mar. 15, 2004) which is expressly incorporated herein, by reference, in its entirety.

The invention claimed is:

1. A power circuit for an electronic machine comprising;
   a first step-up circuit that has a step-up transformer and a current controller, said current controller controlling an amount of current supplied to a primary side of said step-up transformer according to an amount of voltage at a secondary side of said step-up transformer, so that a voltage applied to said primary side of said step-up transformer by a D.C. power source is stepped up to a first voltage;
   a second step-up circuit that steps voltage applied by said D.C. power source up to a second voltage being smaller than said first voltage; and
   a voltage applier that applies said second voltage to said secondary side of said step-up transformer;
   wherein, said current controller controls the amount of current supplied to said primary side of said step-up transformer according to said second voltage when said first step-up circuit starts, so that rush current caused by starting said first step-up circuit is restrained.

2. The power circuit according to claim 1, wherein said first step-up circuit operates intermittently and said second step-up circuit operates continuously, when said electronic machine is driven.

3. The power circuit according to claim 1, wherein said first step-up circuit further comprises:
   a current smoother that smoothes current supplied to primary side of said step-up transformer.

4. The power circuit according to claim 3, wherein said current smoother has a smoothing capacitor, and said first step-up circuit further comprises:
   a resistor that reduces an amount of current supplied to said smoothing capacitor.

5. The power circuit according to claim 4, wherein a resistance of said resistor is between 0.5 (Ω) and 1.5 (Ω).

6. The power circuit according to claim 3, wherein said current controller has a switching regulator and a transistor, said switching regulator detects the amount of voltage at said secondary side of said step-up transformer, lowers the duty ratio of driving signals to said transistor and shortens the on-time of said transistor, when the amount of voltage at secondary side of said step-up transformer is increased, so that the amount of current supplied to said primary side of said step-up transformer is decreased.

7. The power circuit according to claim 6, wherein,
said current smoother has a smoothing coil connected to said D.C. power source and a smoothing capacitor connected to said step-up transformer,
said first step-up circuit has a first rectifying device connected to a secondary-winding of said step-up transformer, a first capacitor connected to said first rectifying device, a second rectifying device that is for accepting said second voltage and that is connected between said first rectifying device and said first capacitor, and
said current controller has a first switching regulator that is for detecting the amount of voltage at said secondary side of said step-up transformer and that is connected between said first rectifying device and said first capacitor in parallel with said second rectifying device, and a first transistor whose on-time is modulated by said first switching regulator according to the amount of voltage at said secondary side of said step-up transformer.

8. The power circuit according to claim 6, wherein,
said second step-up circuit has a coil that is for stepping up voltage applied by said D.C. power source and that is connected to said D.C. power source, a third rectifying device connected to said coil, a second transistor connected to said coil in parallel with said third rectifying device, a second switching regulator connected to said second transistor, a second capacitor connected to said third rectifying device, and a load connected to said third rectifying device in parallel with said second capacitor, said second switching regulator is connected between said second capacitor and said load, and detects an amount of voltage of said second capacitor, and said second switching regulator provides a higher duty ratio for driving signals to said second transistor and extends the on-time of said second transistor when the amount of voltage of said second capacitor is decreased, so that the amount of current supplied to said coil is increased and said voltage applied by said D.C. power source is stepped up to said second voltage, and then said second voltage is applied to said load and said secondary side of said step-up transformer.

9. The power circuit according to claim 1, wherein said electronic machine has an imaging device, and said first voltage is used for driving said imaging device.

10. The power circuit according to claim 1, wherein said electronic machine has a motor, and said second voltage is used for driving said motor.

11. A rush current restraining circuit for an electronic machine comprising;
a step-up circuit that has a step-up transformer and a current controller, said current controller controlling an amount of current supplied to a primary side of said step-up transformer according to an amount of voltage at a secondary side of said step-up transformer, so that the voltage applied by a D.C. power source is stepped up to a first voltage; and
a voltage applier that applies a second voltage being larger than said voltage applied by said D.C. power source and being smaller than said first voltage, to said secondary side of said step-up transformer;
wherein, said current controller controls the amount of current supplied to said primary side of said step-up transformer according to said second voltage when said step-up circuit starts, so that rush current caused by starting said step-up circuit is restrained.

* * * * *